United States Patent
Ota

(10) Patent No.: US 8,326,345 B2
(45) Date of Patent: Dec. 4, 2012

(54) NETWORK SYSTEM, WIRELESS COMMUNICATION DEVICE, WIRELESS COMMUNICATION METHOD, AND COMPUTER PROGRAM PRODUCT

(75) Inventor: Koichiro Ota, Omachi (JP)

(73) Assignee: Seiko Epson Corporation, Tokyo (JP)

( * ) Notice: Subject to any disclaimer, the term of this patent is extended or adjusted under 35 U.S.C. 154(b) by 264 days.

(21) Appl. No.: 12/723,873

(22) Filed: Mar. 15, 2010

(65) Prior Publication Data

US 2010/0238860 A1 Sep. 23, 2010

(30) Foreign Application Priority Data

Mar. 17, 2009 (JP) ................................. 2009-063960

(51) Int. Cl.
*H04W 40/00* (2009.01)

(52) U.S. Cl. ..................................... 455/550.1; 370/328

(58) Field of Classification Search .............. 455/435.1, 455/456.1, 456.2, 524, 550.1; 370/328
See application file for complete search history.

(56) References Cited

U.S. PATENT DOCUMENTS 7,447,906 B2 11/2008 Kubota
2007/0165587 A1* 7/2007 Choi ............................. 370/338

FOREIGN PATENT DOCUMENTS

JP 2003-069923 A 3/2003

* cited by examiner

*Primary Examiner* — Sam Bhattacharya
(74) *Attorney, Agent, or Firm* — AdvantEdge Law Group, LLC

(57) ABSTRACT

In a network system provided with a plurality of wireless networks each having an access point and one or more wireless communication devices wirelessly connectable to the access point, and a predetermined network adapted to connect the access points of the plurality of wireless networks to each other, a predetermined wireless communication device issues inquiry request of the information to the other wireless communication devices, and then receives the inquiry response from each of the other wireless communication devices receiving the inquiry request, thereby receiving the BSSID. The BSSID thus received is accumulated in the first information table. By searching for the BSSID identical to the BSSID of the wireless network to which the predetermined wireless communication device belongs among the BSSID stored in the information table, the predetermined wireless communication device can detect the wireless communication device connected to the predetermined wireless network as the adjacent projector.

8 Claims, 14 Drawing Sheets

TBL1

| PROJECTOR NAME (FD1) | BSSID (FD2) | ADJACENCY (FD3) |
|---|---|---|
| PROJECTOR A | 00:11:22:33:44:55 | |
| PROJECTOR B | 12:34:56:78:90:12 | |
| PROJECTOR C | AB:CD:EF:01:23:45 | |

FIG. 5

TBL2

| SSID | RADIO FIELD INTENSITY | BSSID | CONNECTED | ADJACENCY |
|------|----------------------|-------|-----------|-----------|
| ABC | 15 | 00:11:22:33:44:55 | | |
| ABC | 30 | 12:34:56:78:90:12 | | |
| ABC | 90 | 45:67:89:34:56:78 | ○ | |
| ABC | 75 | AB:CD:EF:01:23:45 | | ○ |

| PROJECTOR NAME | BSSID | ADJACENCY |
|---|---|---|
| PROJECTOR A | 00:11:22:33:44:55 | ○ |
| PROJECTOR B | 12:34:56:78:90:12 | |
| PROJECTOR C | AB:CD:EF:01:23:45 | |

FIG. 10

| SSID (FD21) | RADIO FIELD INTENSITY (FD22) | BSSID (FD23) | ADJACENCY (FD24) |
|---|---|---|---|
| ABC | 15 | 00:11:22:33:44:55 | |
| ABC | 50 | 12:34:56:78:90:12 | |
| ABC | 90 | AB:CD:EF:01:23:45 | ○ |

TBL3

FIG. 14

NETWORK SYSTEM, WIRELESS COMMUNICATION DEVICE, WIRELESS COMMUNICATION METHOD, AND COMPUTER PROGRAM PRODUCT

CROSS-REFERENCE

The present application claims priority from Japanese Patent Application No. 2009-063960 filed on Mar. 17, 2009, which is hereby incorporated by reference in its entirety.

BACKGROUND

In the past, a wireless-network compatible projector has been known. According to the projector of this kind, an image on a personal computer can be enlargedly displayed using the projector without connecting them to each other (e.g., Japanese Patent Publication No. 2003-69923).

As the wireless network, there are two broad types of connection system. One is a system called ad-hoc network, which is a small-scale network in which individual wireless devices are directly connected to each other. The other is a system called infrastructure network, in which individual wireless devices such as a projector perform connection to one of wireless devices as access points, and the access points are connected to each other with a wired network, thereby making it possible to form a large-scale network.

In the ad-hoc network, since connectable devices are limited due to the wireless access range, it is easy to determine the projector adjacent to the personal computer. Therefore, mechanisms for easily searching and connecting the adjacent projector are widely used as, for example, "easy installation."

However, in network systems built up using an infrastructure network of the related art, there arises a problem that it is not achievable to determine whether or not the projector is adjacent from the protocol transmitted on the network, and therefore, it is not achievable to discriminate the adjacent projector.

SUMMARY

Various embodiments may provide a network system, a wireless communication device, a wireless communication method, and a computer program product that making it possible to determine the adjacent projector in the network system built up using the infrastructure network.

According to at least one embodiment of the disclosure, there is provided A network system for managing a plurality of wireless networks including wireless communication devices, the network system including, a plurality of wireless communication devices, a plurality of wireless networks each including, an access point, and at least one wireless communication device of the plurality of wireless communication devices configured to be wirelessly connected to the access point, a predetermined network connecting the access points of the plurality of wireless networks to each other, at least one identifier storage section provided to each of the access points, each of the identifier storage sections configured to store an identifier identifying the wireless network that includes the access point to which the identifier storage section is provided, an inquiry request issuance section provided to a predetermined wireless communication device of the plurality of wireless communication devices, the inquiry request issuance section configured to issue an inquiry request for information to other wireless communication devices of the plurality of wireless communication devices, the other wireless communication devices configured to receive the inquiry request, at least one inquiry response section provided to each of the other wireless communication devices, each of the inquiry response sections configured to issue an inquiry response that includes transmitting the identifier of the wireless network that includes the other wireless communication device, to which the inquiry response section is provided, to the predetermined wireless communication device, a reception/storage control section provided to the predetermined wireless communication device, the reception/storage control section configured to receive the identifiers transmitted from the inquiry response sections and store the identifiers in a connection device information storing memory, wherein each of the identifiers is stored in the connection device information storing memory in correspondence with the other wireless communication device that transmitted the identifier, and a first adjacent device detection section provided to the predetermined wireless communication device, the first adjacent device detection section being configured to search, out of the identifiers stored in the connection device information storing memory, for the identifier that is identical to the identifier of the wireless network that includes the predetermined wireless communication device, wherein the first adjacent device detection section is configured to determine that the other wireless communication device, which transmitted the identifier that is identical to the identifier of the wireless network that includes the predetermined wireless communication device, is an adjacent wireless communication device that is adjacent to the predetermined wireless communication device.

According to the network system described in the above embodiment, each of the access points manages the wireless network to be provided using the identifier provided to the identifier storage section. Thus, the wireless communication devices included in each of the wireless networks can be connected to each other. Further, the predetermined wireless communication device issues the inquiry request of the information to the other wireless communication devices, and then receives the inquiry responses from the other wireless devices receiving the inquiry request, thereby receiving the identifier described above. Each of the identifiers thus received is accumulated in the connection device information storing memory. The predetermined wireless communication device searches the identifier identical to the identifier of the wireless network to which the predetermined wireless communication device itself belongs out of the identifier stored in the connection device information storing memory, thus the predetermined wireless communication device can detect other wireless communication devices connected to the wireless network to which the predetermined wireless communication device belongs, as the adjacent wireless communication device.

Therefore, according to the network system described in the above embodiment, by connecting the access points with a predetermined network, the adjacent wireless communication device can be determined while it is also possible to build up a large-scale network.

According to at least one embodiment of the disclosure, in the network system described in the above embodiment, the predetermined wireless communication device including a wireless network scanning section configured to scan the wireless networks existing around the predetermined wireless communication device in response to failure of the first adjacent device detection section in finding out the adjacent wireless communication device, an adjacent wireless network detection section configured to detect the wireless network that is adjacent to the predetermined wireless communication device out of the wireless networks confirmed to exist by the scan, and a second adjacent device detection section configured to search, out of the identifiers stored in the connection device information storing memory, for the identifier that is identical to the identifier of the wireless network detected by the adjacent wireless network detection section, wherein the second adjacent device detection section is configured to determine that the other wireless communication device, which corresponds to the identifier that is identical to the identifier of the wireless network detected by the adjacent wireless network detection section, is the adjacent wireless communication device.

According to the network system described in the above embodiment, the predetermined wireless communication device scans the wireless networks existing in the periphery with the wireless network scanning section when the first adjacent device detection section fails to find out the adjacent wireless communication device, and detects the adjacent wireless network out of the wireless networks confirmed to exist by the scan. Further, by searching the identifier identical to the identifier of the adjacent wireless network described above out of the identifiers stored in the connection device information storing memory, thus the other wireless communication device connected to the adjacent wireless network described above can be detected as the adjacent wireless communication device.

Therefore, according to the network system described in the above embodiment, even in the case in which the predetermined wireless communication device is moved from the group of a plurality of wireless networks, and is connected to another wireless network, the wireless communication device adjacent to the predetermined wireless communication device can be determined out of the wireless communication devices included in the group described above.

According to at least one embodiment of the disclosure, in the network system described in the above embodiments, the predetermined wireless communication device is an information processing device provided with a display section, the other wireless communication devices are projectors, the information processing device sends image data to the projector which the first adjacent device section determines that the projector is adjacent to the information processing device, and the projector projects images based on the image data.

According to the network system described in the above embodiment, the projector adjacent to the information processing device can be determined.

According to at least one embodiment of the disclosure, in the network system described in the above embodiments, each of the identifiers is a BSSID, and each of the identifier storage sections is configured to store an SSID for identifying a network built up by the plurality of wireless networks together with the BSSID.

According to the network system described in the above embodiment, it becomes possible to build up the network using a multipurpose technology.

According to at least one embodiment of the disclosure, there is provided a network system including a plurality of processing devices connected to each other via a wired network, an access point provided to each of the plurality of processing devices, and adapted to provide a wireless network, and a wireless communication device connected wirelessly to either one of the access points, and each of the access points is provided with an identifier storage section adapted to store an identifier adapted to identify the wireless network provided by the each of the access points, the wireless communication device is provided with an identifier notification section adapted to notify the plurality of access points of the identifier of the wireless network to which the wireless communication device belongs, and each of the plurality of access points is provided with an identifier reception section adapted to receive the identifier transmitted from the identifier notification section of the wireless communication device, a wireless network scanning section adapted to scan the wireless network existing in a periphery, an adjacent wireless network detection section adapted to detect the wireless network adjacent to the access point out of the wireless networks confirmed to exist by the scan, and an adjacent information notification section adapted to determine whether or not the identifier of the wireless network detected by the adjacent wireless network detection section and the identifier received by the identifier reception section are identical to each other, and to transmit information representing that the access point is adjacent to the wireless communication device to the wireless communication device in response to the determination that the identifiers are identical to each other.

According to the network system described in the above embodiment, the identifier of the wireless network to which the wireless communication device belongs is transmitted from the wireless communication device to the access point provided to each of the processing devices. Each of the plurality of access points receiving the identifier scans the wireless network existing in the periphery, and then detects the adjacent wireless network out of the wireless networks confirmed to exist by the scan. Further, when it is determined that the identifier of the wireless network determined to be adjacent thereto and the identifier of the wireless network to which the wireless communication device belongs are identical, the information representing the fact that the relevant access point is adjacent to the wireless communication device is transmitted to the wireless communication device on the ground thereof. If it is determined that the identifiers are identical to each other, it can be determined that the relevant access point is adjacent to the wireless communication device on the ground that the wireless communication device is included in the adjacent wireless network.

Therefore, in the network system having the configuration in which the access points for providing the wireless networks are provided respectively to the plurality of processing devices connected to each other via the wired network, the access point adjacent to the wireless communication device can be determined.

According to at least one embodiment of the disclosure, in the network system described in the above embodiment, the wireless communication device is an information processing device provided with a display section, and the processing devices are projectors.

According to the network system described in the above embodiment, the projector adjacent to the information processing device can be determined.

According to at least one embodiment of the disclosure, in the network system described in the above embodiments, the identifier is BSSID, and the identifier storage section has a configuration of storing SSID adapted to identify a network built up by the plurality of wireless networks together with the BSSID.

According to the network system described in the above, it becomes possible to build up the network using a multipurpose technology.

According to at least one embodiment of the disclosure, there is provided a predetermined wireless communication device connected to a network system that includes a plurality of wireless networks each having an access point, a plurality of wireless communication devices that includes the predetermined wireless communication device, each access point configured to be wirelessly connected to at least one wireless communication device of the plurality of wireless communication devices, and a predetermined network configured to connect the access points of the plurality of wireless networks to each other, the predetermined wireless communication device comprising, an inquiry request issuance section configured to issue an inquiry request regarding identifiers for identifying each of a plurality of wireless networks, each of the wireless networks including an access point, the inquiry request issued to other wireless communication devices included in the plurality of wireless networks, a reception/storage control section configured to store the identifiers obtained by receiving an inquiry response from each of the other wireless communication devices, each of the identifiers stored in a connection device information storing memory in correspondence with the other wireless communication device that transmitted the identifier, and a first adjacent device detection section configured to search, out of the identifiers stored in the connection device information storing memory, for the identifier that is identical to the identifier of the wireless network that includes the predetermined wireless communication device, wherein the first adjacent device detection section is configured to determine that the other wireless communication device, which transmitted the identifier that is identical to the identifier of the wireless network that includes the predetermined wireless communication device, is an adjacent wireless communication device that is adjacent to the predetermined wireless communication device.

According to the wireless communication device described in the above embodiment, the adjacent wireless communication device can be determined while it is possible to build up the large-scale network.

According to at least one embodiment of the disclosure, in the wireless communication device described in the above embodiment, there are further provided a wireless network scanning section configured to scan the wireless networks existing around the predetermined wireless communication device in response to failure of the first adjacent device detection section in finding out the adjacent wireless communication device, an adjacent wireless network detection section configured to detect the wireless network that is adjacent to the predetermined wireless communication device out of the wireless networks confirmed to exist by the scan; and a second adjacent device detection section configured to search, out of the identifiers stored in the connection device information storing memory, for the identifier that is identical to the identifier of the wireless network detected by the adjacent wireless network detection section, wherein the second adjacent device detection section is configured to determine that the other wireless communication device, which corresponds to the identifier that is identical to the identifier of the wireless network detected by the adjacent wireless network detection section, is the adjacent wireless communication device.

According to the wireless communication device described in the above embodiment, even in the case in which the predetermined wireless communication device is moved from the group of a plurality of wireless networks, and is connected to another wireless network, the wireless communication device adjacent to the predetermined wireless communication device can be determined out of the wireless communication devices included in the group described above.

According to at least one embodiment of the disclosure, there is provided a wireless communication method of connecting a predetermined wireless communication device to a network system that includes a plurality of wireless networks each having an access point, a plurality of wireless communication devices that includes the predetermined wireless communication device, each access point configured to be wirelessly connected to at least one wireless communication device of the plurality of wireless communication devices, and a predetermined network configured to connect the access points of the plurality of wireless networks to each other, the method including, issuing, from a predetermined wireless communication device, an inquiry request regarding identifiers for identifying each of a plurality of wireless networks to other wireless communication devices included in the plurality of wireless networks, each of the wireless networks including an access point, storing the identifiers obtained by receiving an inquiry response from each of the other wireless communication devices, each of the identifiers stored in a connection device information storing memory in correspondence with the other wireless communication device that transmitted the identifier, searching, out of the identifiers stored in the connection device information storing memory, for the identifier that is identical to the identifier of the wireless network that includes the predetermined wireless communication device, and determining that the other wireless communication device, which transmitted the identifier that is identical to the identifier of the wireless network that includes the predetermined wireless communication device, is an adjacent wireless communication device that is adjacent to the predetermined wireless communication device.

According to at least one embodiment of the disclosure, there is provided a computer program product for making a computer perform a method of connecting a predetermined wireless communication device to a network system that includes a plurality of wireless networks each having an access point, a plurality of wireless communication devices that includes the predetermined wireless communication device, each access point configured to be wirelessly connected to at least one wireless communication device of the plurality of wireless communication devices, and a predetermined network configured to connect the access points of the plurality of wireless networks to each other, the method including, issuing, from a predetermined wireless communication device, an inquiry request regarding identifiers for identifying each of a plurality of wireless networks to other wireless communication devices included in the plurality of wireless networks, each of the wireless networks including an access point, storing the identifiers obtained by receiving an inquiry response from each of the other wireless communication devices, each of the identifiers stored in a connection device information storing memory in correspondence with the other wireless communication device that transmitted the identifier, searching, out of the identifiers stored in the connection device information storing memory, for the identifier that is identical to the identifier of the wireless network that includes the predetermined wireless communication device, and determining that the other wireless communication device, which transmitted the identifier that is identical to the identifier of the wireless network that includes the predetermined wireless communication device, is an adjacent wireless communication device that is adjacent to the predetermined wireless communication device.

According to the wireless communication method and the computer program product described in the above embodiments, the adjacent wireless communication device can be determined while it is possible to buildup the large-scale network.

It should be noted that the present embodiments can be realized in various forms such as a recording medium storing the program described above or a data signal including the program and realized in the carrier wave. Further, the embodiments can also be realized in various forms such as a device, a method, a program, a recording medium storing the program, or a data signal including the program and realized in the carrier wave each for realizing each of the sections of the other wireless communication device in the network system.

BRIEF DESCRIPTION OF THE DRAWINGS

Non-limiting and non-exhaustive embodiments of the present disclosure will be described with reference to the accompanying drawings, wherein like reference numbers reference like elements.

FIG. 5 is an explanatory diagram showing an example of a first information table.

FIG. 7 is an explanatory diagram showing an example of a second information table.

FIG. 10 is an explanatory diagram showing the first information table in the connection state shown in FIG. 9.

FIG. 14 is an explanatory diagram showing an example of a third information table.

DESCRIPTION OF EMBODIMENTS

Figure 1:
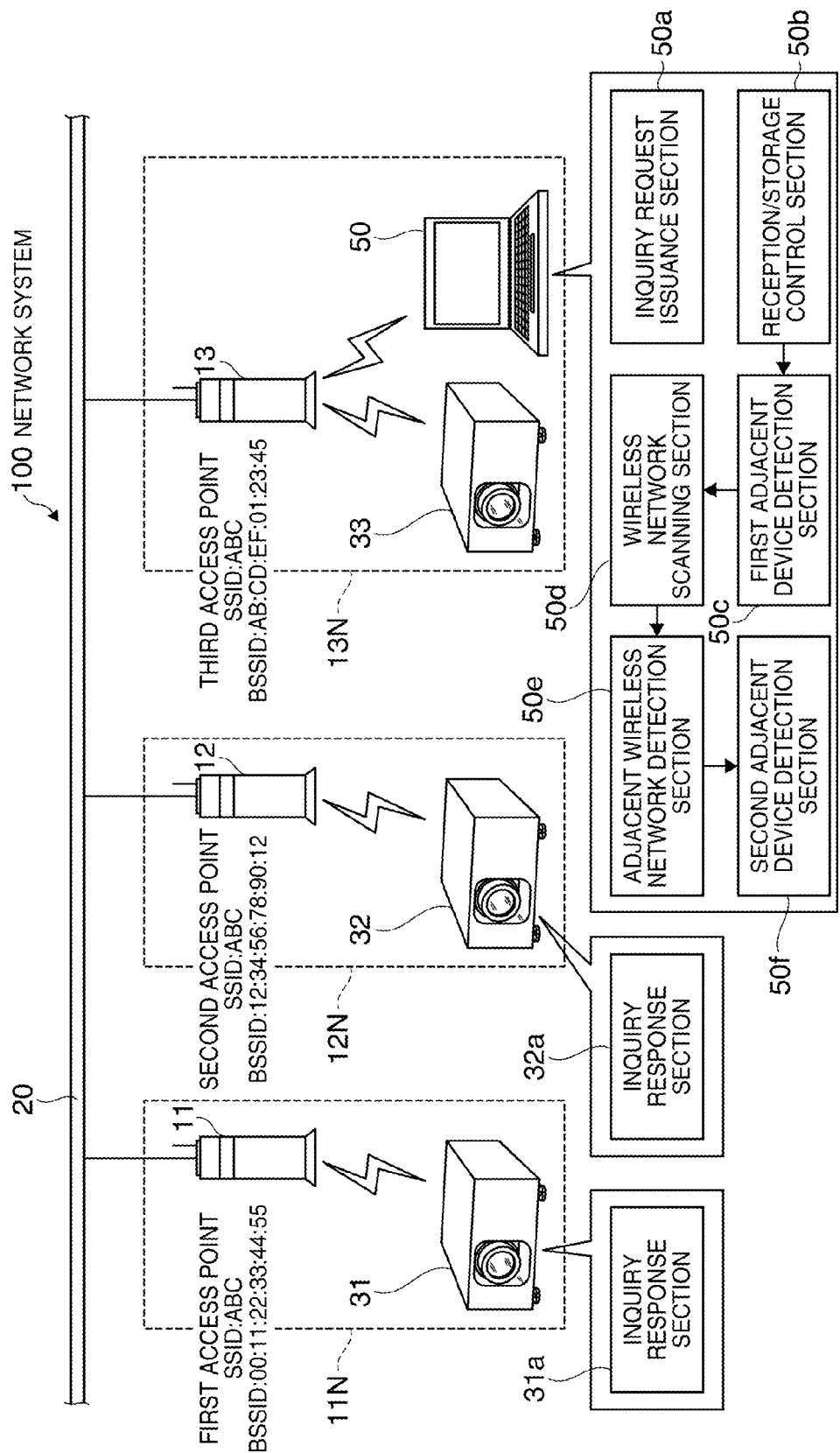
FIG. 1 is a block diagram showing a network system as a first embodiment of the invention.

Embodiments of the disclosure will hereinafter be explained based on specific examples with reference to the accompanying drawings.
1. First Embodiment
1-A. Configuration FIG. 1 is a block diagram showing a network system 100 as a first embodiment of the invention. As shown in the drawing, the network system 100 is provided with first through third access points 11, 12, 13, and the first through third access points 11 through 13 are connected to each other via a wired network 20. The access points 11 through 13 are respectively connected to projectors 31, 32, 33 in a wireless manner. Further, there exists a personal computer (hereinafter referred to as a "PC") 50 connected wirelessly to the third access point 13.

The first through third access points 11 through 13 are each provided with two identifiers called a service set identifier (SSID) and a basic service set identifier (BSSID) stored in the respective memory devices. The SSID is a name with respect to the network, and composed of up to 32 characters. The BSSID is an identification code with respect to a single wireless network, and is a 48-bit fixed-length identifier. Specifically, the SSID in the first through third access points 11 through 13 are identical to each other, and "ABC," for example. The BSSID of the first access point 11 is, for example, "00:11:22:33:44:55," the BSSID of the second access point 12 is, for example, "12:34:56:78:90:12," and the BSSID of the third access point 13 is, for example, "AB:CD:EF:01:23:45."

The first through third access points 11, 12, 13 manage the wireless networks provided by themselves, namely the wireless networks 11N, 12N, 13N, using the SSID and the BSSID described above.

Figure 2:
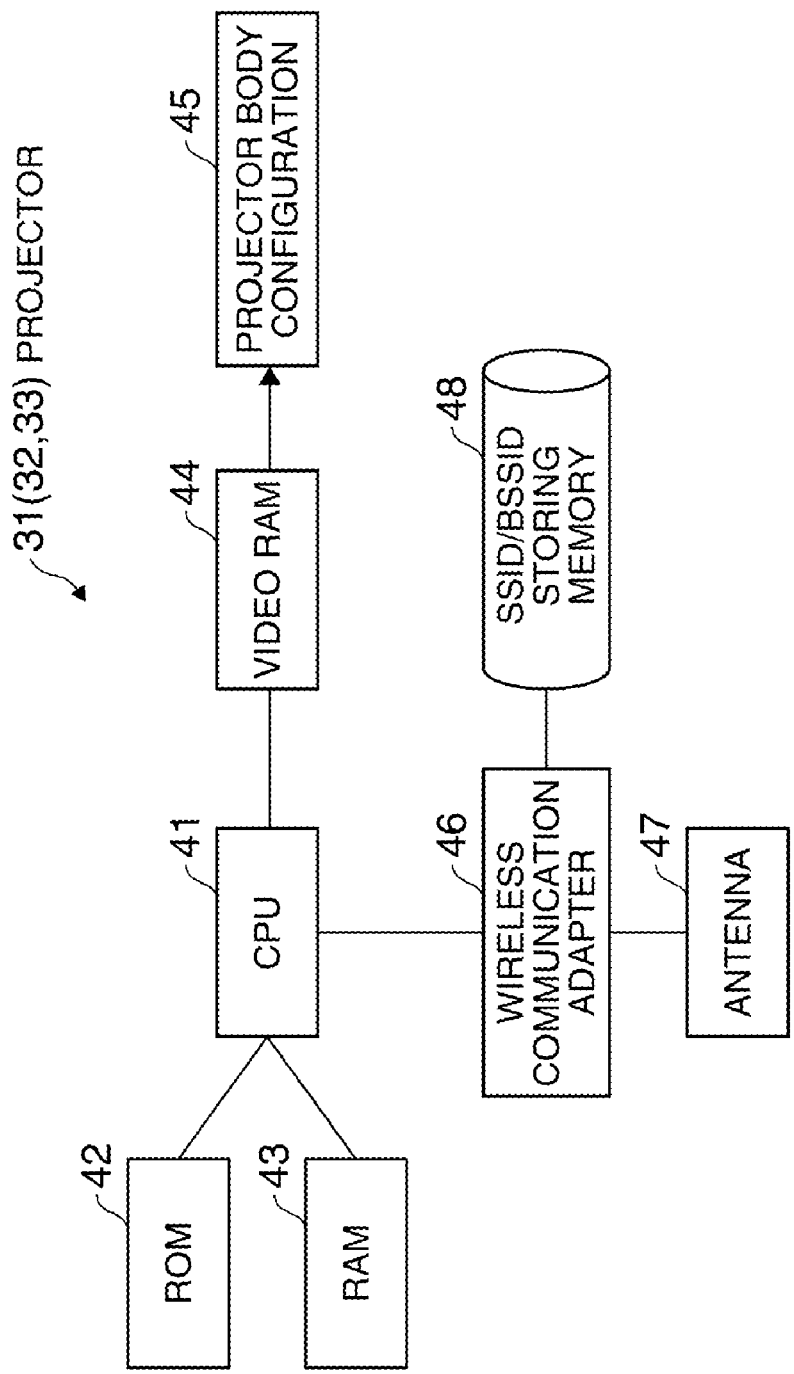
FIG. 2 is a block diagram schematically showing a configuration of each of projectors.

FIG. 2 is a block diagram schematically showing a configuration of each of the projectors 31 through 33. The projectors 31 through 33 are each provided with a CPU 41, a ROM 42, a RAM 43, and a video RAM 44. The CPU 41 acts along a program stored in the ROM 42, and controls each of the sections 42 through 44. The video RAM 44 is a memory for storing images.

Further, although the projectors 31 through 33 are each provided with a projector body configuration 45, the projector main configuration 45 is not described in detail here, but is shown as a large functional block. The image stored in the video RAM 44 is transferred to the projector body configuration 45, and is drawn on a screen not shown.

Further, the projectors 31 through 33 are each provided with a wireless function. The wireless function is implemented as a wireless communication adapter 46 and an antenna 47. The wireless communication adapter 46 performs transmission and reception of wireless information in response to an instruction from the CPU 41. In reality, an electric wave is emitted in the air via the antenna 47. The wireless communication adapter 46 is provided with an SSID/BSSID storing memory 48, and stores the SSID and BSSID retrieved from one of the access points 11 through 13 connected to itself into the SSID/BSSID storing memory 48.

Figure 3:
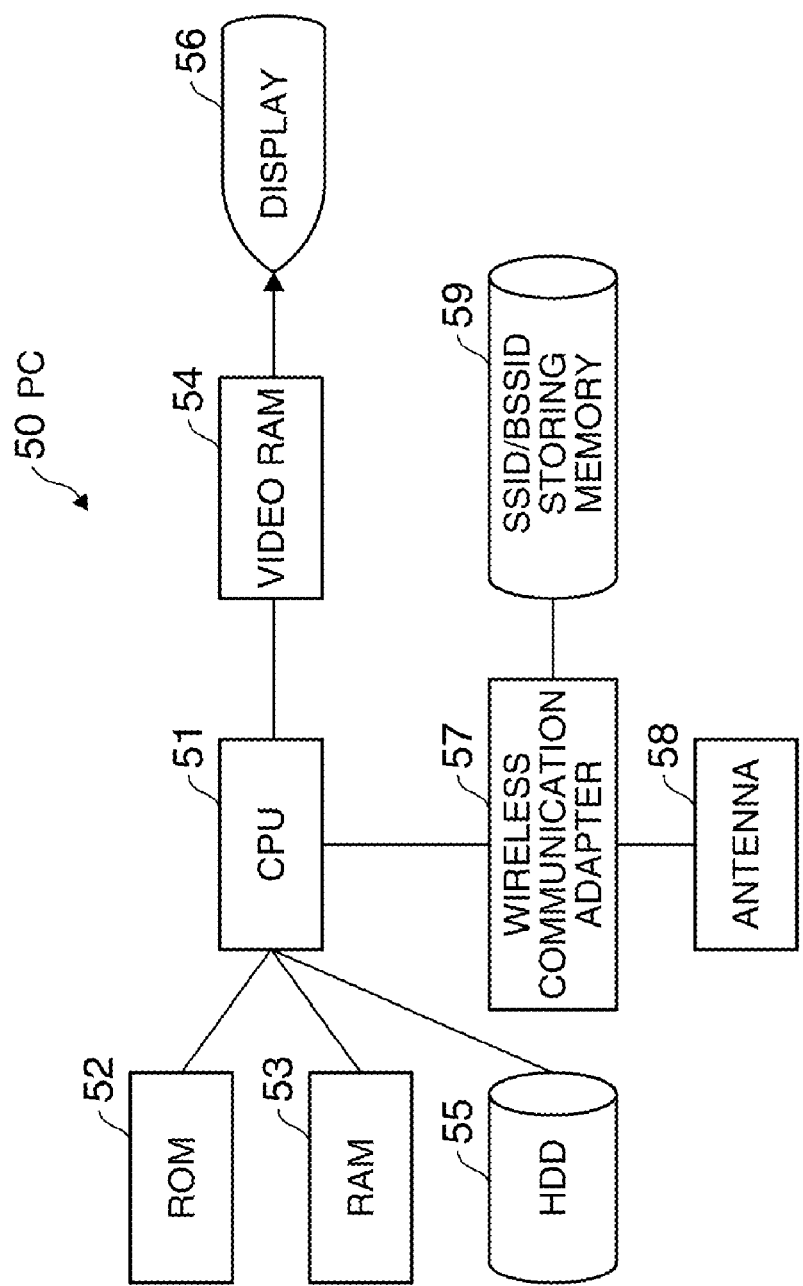
FIG. 3 is a block diagram schematically showing a configuration of a PC.

FIG. 3 is a block diagram schematically showing a configuration of the PC 50. The PC 50 is of a so-called laptop type, and is easy to carry. It should be noted that the PC 50 is not necessarily limited to the laptop type, but can also be a personal computer of other types, such as a desktop type. As shown in the drawing, the PC 50 is provided with a CPU 51, a ROM 52, a RAM 53, a video RAM 54, and a hard disk drive (HDD) 55. The CPU 51 acts along a program transferred from the HDD 55 and then stored in the RAM 53, and controls each of the sections 52 through 55. The video RAM 54 is a memory for storing images. The image stored in the video RAM 54 is drawn on a display 56.

Further, the PC 50 is provided with a wireless function. The wireless function is implemented as a wireless communication adapter 57 and an antenna 58. The wireless communication adapter 57 performs transmission and reception of wireless information in response to an instruction from the CPU 51. In reality, an electric wave is emitted in the air via the antenna 58. The wireless communication adapter 57 is provided with an SSID/BSSID storing memory 59, and stores the SSID and BSSID retrieved from the access point (the third access point 13 in this embodiment) connected to the PC 50 into the SSID/BSSID storing memory 59.

It should be noted that the PC 50 described above is not necessarily limited to a personal computer, but can also be replaced with other information terminal equipment such as a personal digital assistant (PDA) providing it has the configuration described above. Further, it is not necessarily required to provide all of the sections described above, but any equipment provided with the wireless function and the display section can be adopted.

According to the configuration described above, as shown in FIG. 1, the first through third wireless networks 11N through 13N belong to the network system 100 provided with the SSID of "ABC," the first projector 31 is connected to the first wireless network 11N, the second projector 32 is connected to the second wireless network 12N, and the third projector 33 and the PC 50 are connected to the third wireless network 13N. It should be noted that the projectors 31 through 33 correspond to "wireless communication devices" provided to the invention, and the PC 50 corresponds to a "predetermined wireless communication device" provided to the invention.

According to the network system 100 with such a configuration, it is possible to enlargedly display the image edited by the PC 50 on the screen not shown using the third projector 33. Further, it is also possible to transmit data such as an image edited by the PC 50 to other networks 11N, 12N via the wired network 20, or to receive data by the PC 50 via the wired network 20.

Further, by moving the PC 50 to effective areas of other wireless networks 11N, 12N, it is also possible for the operator to enlargedly display the image using the first and second projector 31, 32, respectively. In such a case, the operator is required to perform an operation of selecting and designating the destination projector among the list of all of the projectors using the PC 50, prior to the display of this list, and the PC 50 executes an adjacent projector detection process for detecting the projector adjacent to the PC 50.

The adjacent projector detection process is executed by functions of an inquiry request issuance section 50a, a reception/storage control section 50b, a first adjacent device detection section 50c, a wireless network scanning section 50d, an adjacent wireless network detection section 50e, and a second adjacent device detection section 50f, realized by the PC 50. The functions of the respective sections 50a through 50f and the adjacent projector detection process will hereinafter be explained.

Figure 4:
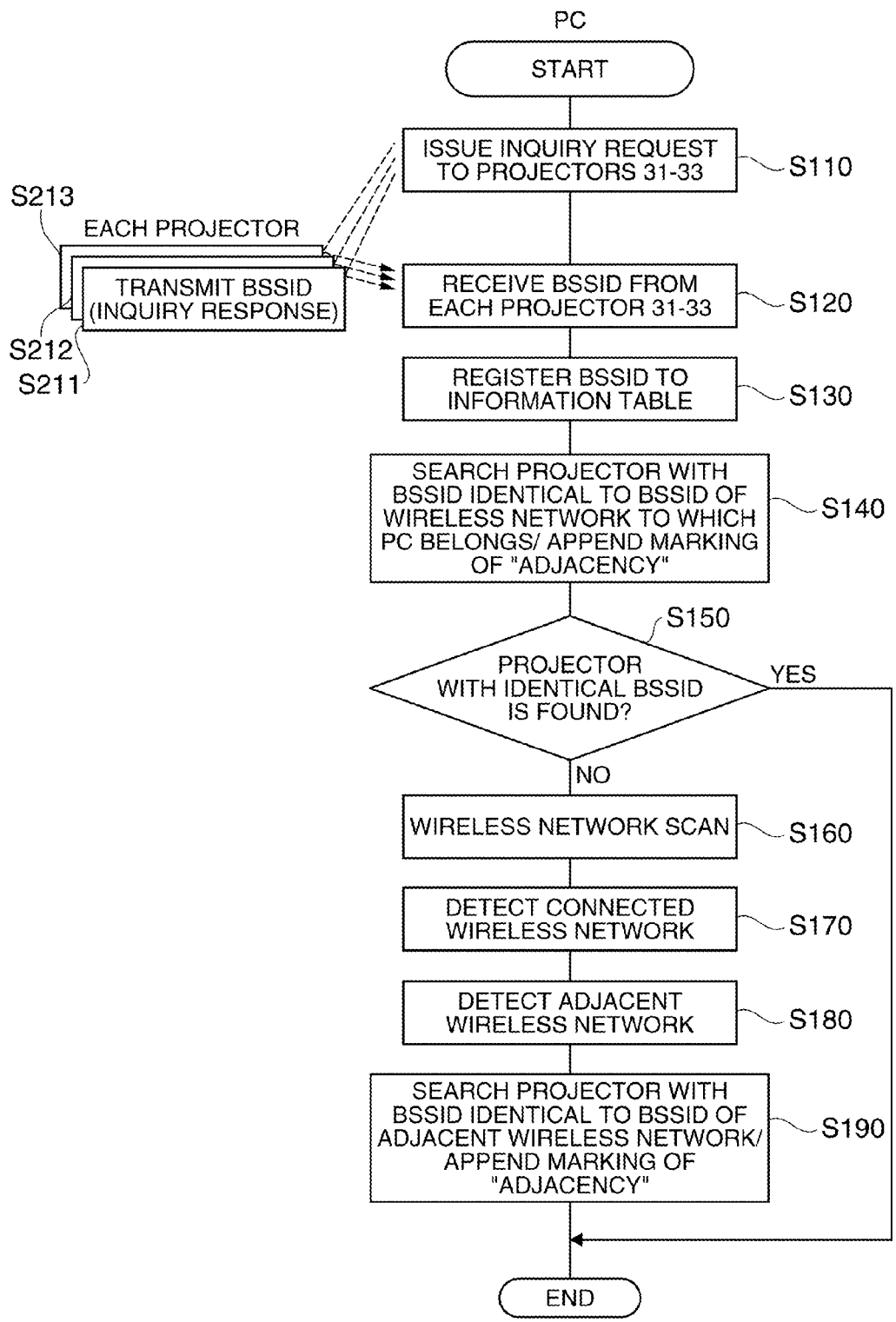
FIG. 4 is a flowchart showing an adjacent projector detection process executed by the PC.

FIG. 4 is a flowchart showing the adjacent projector detection process executed by the PC 50. The adjacent projector detection process is executed by the CPU 51 along the software (the program) installed in the HDD 55 provided to the PC 50.

As shown in the drawing, when the process is started, the CPU 51 of the PC 50 firstly issues an inquiry request to all of the projectors 31 through 33 included in the network to which the PC 50 belongs (step S110). Here, the "network to which the PC 50 belongs" denotes a group of wireless networks 11N through 13N provided by the respective access points 11 through 13 storing the SSID identical to the SSID stored in the SSID/BSSID storing memory 59 provided to the PC 50. In other words, it denotes the group of the wireless networks 11N through 13N provided by the respective access points 11 through 13 storing the SSID of "ABC," and the inquiry request is issued to all of the projectors 31 through 33 included in the group in the step S110.

The "inquiry request" is for inquiring of each of the projectors 31 through 33 about the BSSID stored therein. The method of the inquiry request is known, and will not explained here in detail, but can be implemented as, for example, a method of issuing a protocol called user datagram protocol (UDP) as a broadcast message, and describing a command for requesting the inquiry as the content thereof.

In FIG. 1, the inquiry request described above is transmitted from the PC 50 to the third projector 33 connected to the same wireless network 13N, and at the same time, transmitted to the first projector 31 and the second projector 32 connected respectively to the other wireless networks 11N, 12N via the wired network 20. The inquiry request issuance section 50a provided to the PC 50 has a function corresponding to the step S110 described above.

In response to the inquiry request, the first through third projectors 31 through 33 perform the process of retrieving the BSSID stored in the own SSID/BSSID storing memory 48, and then transmitting the BSSID to the PC 50 as the request source. This process corresponds to the process of an inquiry response. The method of the inquiry response is known, and therefore will not be explained here in detail, but can be implemented as, for example, a method of issuing the UDP protocol to the PC 50 as a unicast message, and the BSSID is described as the content thereof. It should be noted that in the present embodiment each of the projectors 31 through 33 previously stores the name (hereinafter referred to as a "projector name") of itself in the RAM 53, and transmits the projector name together with the BSSID in the inquiry response described above.

Inquiry response sections 31a, 32a (see FIG. 1, the inquiry response section provided to the projector 33 is not shown) provided respectively to the projectors 31 through 33 each correspond to the function for realizing the inquiry response. In FIG. 4, the processes of the steps S211 through S213 executed respectively by the projectors 31 through 33 correspond to the inquiry response sections 31a, 32a (the inquiry response section of the projector 33 is not shown).

The CPU 51 of the PC 50 thereafter receives (step S120) the BSSID transmitted from each of the first through third projectors 31 through 33, and then registers (step S130) the BSSID to the first information table TBL1. It should be noted that since the projector name is transmitted from each of the projectors 31 through 33 together with the BSSID as described above, in the detailed description, the projector name is received together with the BSSID in the step S120, and the BSSID and the projector name are registered to the first information table TBL1 so as to form a group in the step S130. It should be noted that the first information table TBL1 is prepared in the RAM 53 of the PC 50. The RAM 53 provided with the first information table TBL1 corresponds to a "connected device information storing memory" provided to the invention.

FIG. 5 is an explanatory diagram showing an example of the first information table TBL1. As shown in the drawing, the first information table TBL1 is provided with three fields FD1, FD2, and FD3 of [PROJECTOR NAME], [BSSID], and [ADJACENCY], respectively. In the step S130, there is executed a process of storing the projector name, thus received, into the [PROJECTOR NAME] field FD1, and the BSSID, thus received, into the [BSSID] field FD2, for each of the projectors 31 through 33.

As a result, as shown in FIG. 5, "projector A," the name of the first projector 31, is stored into the [PROJECTOR NAME] field FD1 in the first record (the first row shown in the drawing), and "00:11:22:33:44:55," the BSSID of the first wireless network 11N, is stored in the [BSSID] field FD2 in the first record. In the second record (the second row shown in the drawing), "projector B," the name of the second projector 32, is stored into the [PROJECTOR NAME] field FD1, and "12:34:56:78:90:12," the BSSID of the second wireless network 12N, is stored in the [BSSID] field FD2. In the third record (the third row shown in the drawing), "projector C," the name of the third projector 33, is stored into the [PROJECTOR NAME] field FD1, and "AB:CD:EF:01:23:45," the BSSID of the third wireless network 13N, is stored in the [BSSID] field FD2.

The [ADJACENCY] field FD3 is a field for storing a marking for determining whether or not the projector is adjacent to the PC 50, and is set to be blank immediately after the execution of the step S130.

It should be noted that although in the present embodiment there is adopted the configuration in which the PC 50 obtains the projector names using the inquiry responses by the projectors 31 through 33, it is also possible to adopt a configuration instead thereof in which the PC 50 previously registers the projector names and does not communicate the projector names in the inquiry response. The process in the steps S120 and S130 described above corresponds to the reception/storage control section 50b shown in FIG. 1.

Going back to FIG. 4, after execution of the step S130, the CPU 51 of the PC 50 retrieves the BSSID for identifying the wireless network to which the PC 50 belongs from the SSID/BSSID storing memory 59, and then performs a search in the first information table TBL1 using the BSSID as a search key. Specifically, the CPU 51 compares the search key sequentially with the content of the [BSSID] field FD2 of each record in the first information table TBL1, thereby detecting the record with the content identical to the search key. Further, the CPU 51 stores the marking representing the fact that the projector corresponding to the record is adjacent to the PC 50, into the [ADJACENCY] field FD3 with respect to the record detected to have the content identical thereto.

Figure 6:
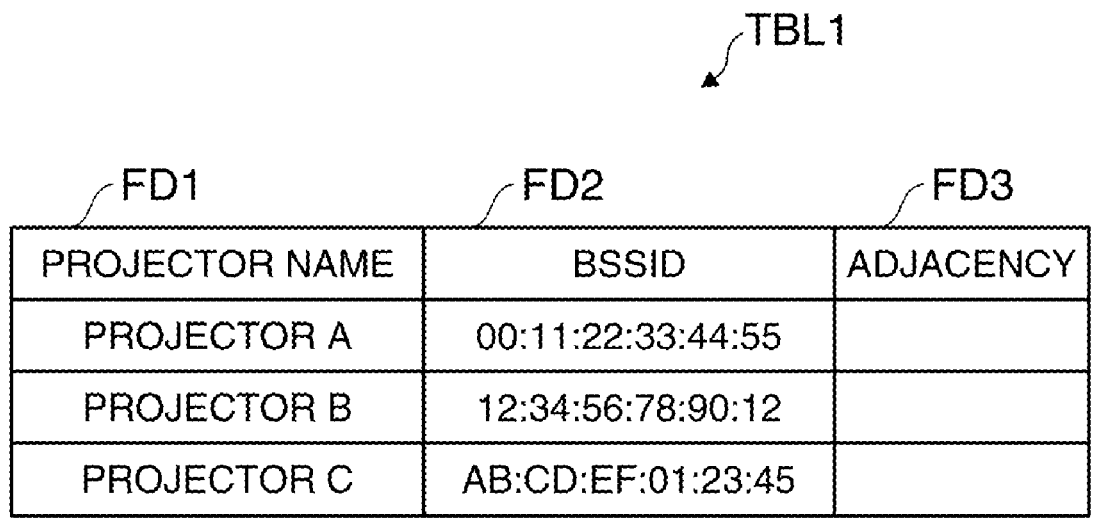
FIG. 6 is an explanatory diagram showing the first information table to which a marking representing adjacency has been provided.

FIG. 6 is an explanatory diagram showing the first information table TBL1 to which the marking representing the adjacency has been provided. Since the BSSID of the wireless network to which the PC 50 belongs is "AB:CD:EF:01:23:45," the record with the content identical thereto is the record on the third row from the top as shown in the drawing, and therefore, the symbol "○38 the marking representing the adjacency, is stored into the [ADJACENCY] field FD3 of this record. The process of the step S140 described above corresponds to the first adjacent device detection section 50c shown in FIG. 1.

Going back to FIG. 4, after the execution of the step S140, the CPU 51 determines (step S150) whether or not the record with the identical content has been found out due to the search of the step S140, namely whether or not the projector with the identical BSSID has been found out, and if it is determined that the identical one has been found out, the process escapes to "END," to terminate the adjacent projector detection process. After the adjacent projector detection process, PC50 sends image data to the adjacent projector which the adjacent projector detection process detects and the projector projects images based on the image data.

On the other hand, if it is determined in the step S150 that nothing identical has been found out, the CPU 51 makes the process proceed to the step S160 to perform a wireless network scan for scanning a wireless network existing around the PC 50. The wireless network scan is one of the functions realized by the wireless communication adapter 57 provided to the PC 50, and the CPU 51 makes the wireless communication adapter 57 perform the wireless network scan. In a detailed explanation, the wireless communication adapter 57 wirelessly emits a message to the periphery, and receives the responses (the SSID and the BSSID) from the access points 11 through 13 belonging respectively to the wireless networks 11N through 13N existing around the PC 50. Thus, the wireless networks 11N through 13N existing around the PC 50 are searched. Further, the wireless communication adapter 57 measures the radio field intensity of each of the signals of the responses, and then stores the SSID and the BSSID obtained from each of the responses, and the radio field intensity thus measured into the second information table TBL2 so as to form a group.

FIG. 7 is an explanatory diagram showing an example of the second information table TBL2. As shown in the drawing, the second information table TBL2 is provided with five fields FD11, FD12, FD13, FD14, and FD15 of [SSID], [RADIO FIELD INTENSITY], [BSSID], [CONNECTED], and [ADJACENCY], respectively. In the step S160, there is executed a process of storing the SSID thus received into the [SSID] field FD11, the radio field intensity thus measured into the [RADIO FIELD INTENSITY] field FD12, and the BSSID thus received into the [BSSID] field FD13, for each of the wireless networks 11N through 13N. The [radio field intensity] field FD12 is assumed to be a value expressed using "%" as the unit.

The example shown in FIG. 7 corresponds to the case in which the PC 50 is moved from the connection state shown in FIG. 1 to the outside of the third wireless network 13N, and is connected to a fourth wireless network with the BSSID of "45:67:89:34:56:78." Specifically, in the case in which the BSSID of the wireless network to which the PC 50 is connected is "45:67:89:34:56:78," it is determined in the step S150 that no identical projector has been found out, and the wireless network scan is performed. The content of the second information table TBL2 obtained as a result thereof corresponds to the example shown in FIG. 7.

The [CONNECTED] field FD14 is a field for storing the marking for determining whether or not the wireless network is connected to the PC 50 which has performed the wireless network scan. The [ADJACENCY] field FD15 is a field for storing the marking for determining whether or not the wireless network is adjacent to the PC 50. It should be noted that although in the drawing the symbol "○" is stored in each of the [CONNECTED] field FD14 in the third row from the top and the [ADJACENCY] field FD15 in the fourth row from the top, these fields are set to be blank immediately after the execution of the step S160. The process in the steps S150 and S160 described above corresponds to the wireless network scanning section 50d shown in FIG. 1.

Going back to FIG. 4, after the execution of the step S160, the CPU 51 of the PC 50 compares the SSID stored in the SSID/BSSID storing memory 59 sequentially with the content of the [BSSID] field FD13 of each record in the second information table TBL2, thereby detecting the record with the content identical thereto. Further, with respect to the record detected to have the identical content, the marking of "○" representing the fact that the wireless network is connected to the PC 50 is stored into the [CONNECTED] field FD14 (step S170). In the example shown in FIG. 7, since the example corresponds to the case in which the PC 50 is connected to the fourth wireless network with the BSSID of "45:67:89:34:56:78" as described above, the marking "○" is stored into the [CONNECTED] field FD14 in the third row from the top.

Subsequently, the CPU 51 sequentially determines whether or not the radio field intensity stored in the [RADIO FIELD INTENSITY] field FD12 of each record in the second information table TBL2 is equal to or higher than a predetermined value (e.g., 60%), thereby detecting the record with the higher radio field intensity out of the records in the second information table TBL2 (step S180). The record with the higher radio field intensity denotes that the wireless network is adjacent to the PC 50. It should be noted that the record determined to be "connected" in the step S170 is omitted from the detection objects. In other words, it can be said that the process of the step S180 is for detecting the wireless network adjacent to the PC 50 out of the wireless networks confirmed to exist by the wireless network scan in the step S160. Further, in the step S180, with respect to the record detected to have the higher radio field intensity, the marking of "○" representing the fact that the wireless network is adjacent to the PC 50 is stored into the [ADJACENCY] field FD15.

It should be noted that in the present embodiment, since the determination of whether or not the wireless network is adjacent thereto is made based on whether or not the radio field intensity is equal to or higher than the predetermined value, it is possible that two or more wireless networks are determined to be adjacent thereto. It should be noted that it is also possible to adopt a configuration, in which only the wireless network with the larger radio field intensity is determined to be adjacent thereto if it is determined that two or more wireless networks are relevant, instead of the configuration described above. Further, it is also possible to adopt a configuration in which the wireless network with the maximum radio field intensity is determined to be adjacent thereto without determining whether or not the radio field intensity is equal to or higher than the predetermined value.

Subsequently, the CPU 51 retrieves the content of the [BSSID] field FD13 with respect to the record with the [ADJACENCY] field FD15 storing the marking of "○" from the second information table TBL2, and performs the search in the first information table TBL1 using the BSSID thus retrieved as the search key. Specifically, the CPU 51 compares the search key sequentially with the content of the [BSSID] field FD2 in each record of the first information table TBL1, thereby detecting the record with the content identical to the search key. Further, the CPU 51 stores the marking of "○" representing the fact that the projector corresponding to the record is adjacent to the PC 50, into the [ADJACENCY] field FD3 with respect to the record detected to have the content identical thereto (step S190).

As a result of the step S190, the projector connected to the wireless network determined in the step S180 to be adjacent to the PC 50 is detected, and the marking of "○" representing the fact that the projector is adjacent thereto is stored into the first information table TBL1. In the example shown in FIG. 7, since the BSSID of the wireless network adjacent to the PC 50 is "45:67:89:34:56:78," the marking of "○" is consequently appended to the "projector C" as the adjacent projector in the first information table TBL1 shown in FIG. 6.

The process of the step S180 described above corresponds to the adjacent wireless network detection section 50e shown in FIG. 1, and the process of the step S190 corresponds to the second adjacent device detection section 50f. After the execution of the step S190, the process escapes to "END" to terminate the adjacent projector detection process.

The projector (hereinafter referred to as an "adjacent projector") adjacent to the PC 50 detected by the adjacent projector detection process described above is determined to have high possibility of being connected to the adjacent projector when the PC is moved. Therefore, by expressly displaying the adjacent projector when connecting the PC 50 to the network, convenience of the operator can be enhanced. The following display methods are possible, for example.

(a) Only the "projector C," the adjacent projector, is displayed as a candidate of the connectable projector.

(b) The "projector C," the adjacent projector, is displayed with the highest priority among the connectable projectors.

(c) The letters of the "projector C," the adjacent projector, are emphasized or enlarged, for example, to increase the priority thereof.

Figure 8:
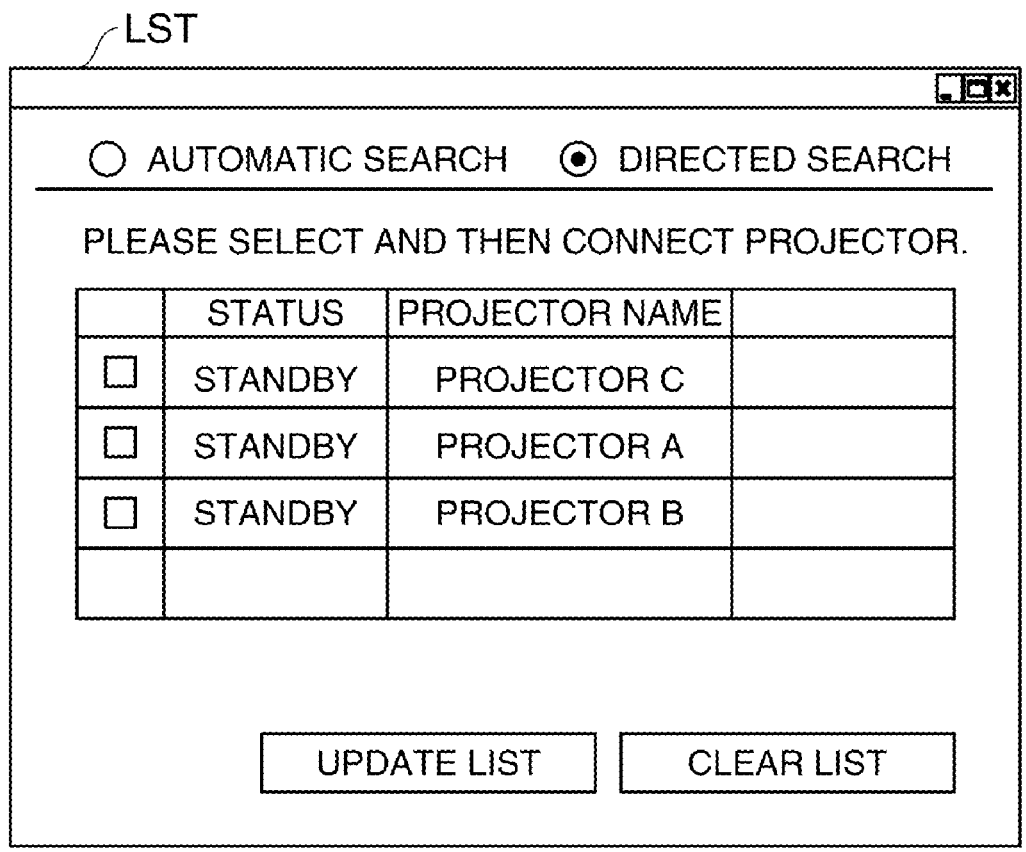
FIG. 8 is an explanatory diagram showing an example of a specific list representing adjacency.

FIG. 8 is an explanatory diagram showing an example of a specific list LST of the alternative (b) described above. The list is displayed on the display 56 of the PC 50, and for displaying the connectable projectors in a view format. The list LST is formed along the content of the first information table TBL1 exemplified in FIG. 6, and has a configuration of particularly displaying the projector (the "projector C" in this case) with the marking representing the adjacency in the [ADJACENCY] field FD3 at the top thereof. Thus, since the operator can be made aware of the "projector C" with the highest priority among the projectors displayed on the list, it becomes possible to connect the PC 50 to the adjacent projector by connecting it to the "projector C," thus the convenience can be enhanced.

It should be noted that it is also possible to adopt a configuration of displaying characters such as "adjacency" in the row corresponding to the "projector C," and in this case, it is possible to more clearly inform the operator of the adjacency.

Figure 9:
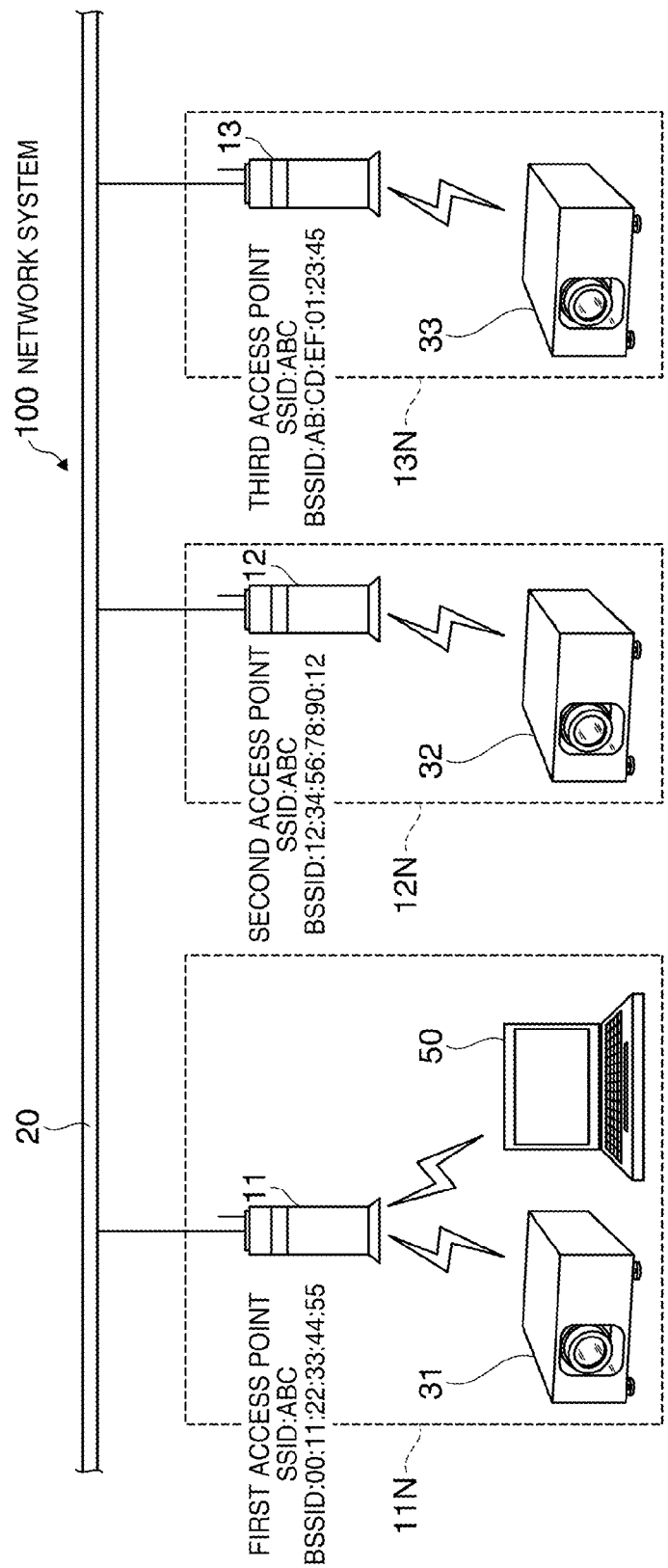
FIG. 9 is an explanatory diagram showing a state of the network system shown in FIG. 1, in which the PC has been moved.

FIG. 9 is an explanatory diagram showing a state of the network system 100 shown in FIG. 1, in which the PC 50 has been moved. As shown in the drawing, the PC 50 is moved to the area of the first wireless network 11N. The PC 50 can detect the fact that the information of the BSSID of the wireless network to which the PC 50 is connected is changed, by constantly monitoring the information, or by receiving a notification of the change thereof. The method thereof, which is known, and therefore, the explanations of which will be omitted, is typically executed by the function call or the callback to the driver of the wireless adapter. Therefore, when the PC 50 is moved, the identifier information stored in the SSID/BSSID storing memory 59 is updated.

In the state shown in FIG. 9, when the adjacent projector detection process described above is executed, the content of the first information table TBL1 becomes what is shown in FIG. 10. In the connection state shown in FIG. 9, since the BSSID of the first wireless network 11N to which the PC 50 is connected is "00:11:22:33:44:55," the marking representing the adjacent projector is consequently provided to the "projector A," which is the projector having the BSSID identical to "00:11:22:33:44:55," as shown in FIG. 10.

1-B. Advantages

According to the network system 100 of the first embodiment configured as described above, the PC 50 issues inquiry request of the information to the projectors 31, 32, 33, and then receives the inquiry response from each of the projectors 31, 32, 33 receiving the inquiry request, thereby receiving the BSSID. The BSSID thus received is accumulated in the first information table TBL1. By searching for the BSSID identical to the BSSID of the wireless network 13N to which the PC 50 belongs among the BSSID stored in the first information table TBL1, the PC 50 can detect the projector 33 connected to the wireless network 13N, to which the PC 50 belongs, as the adjacent projector (see FIG. 1).

Therefore, according to the network system 100, the projector adjacent to the PC 50 can be determined while it is possible to build up a large-scale network (i.e., while using the infrastructure network) by connecting the access points 11 through 13 with the wired network 20.

Further, according to the network system 100, when the projector adjacent to the PC 50 is not found out, the PC 50 performs the wireless network scan, thereby detecting the adjacent wireless network among the wireless networks 11N through 13N confirmed to exist by the scan. Further, by searching for the projector with the BSSID identical to the BSSID of the adjacent wireless network in the BSSID stored in the first information table TBL1, the PC 50 can detect the projector, which is connected to the adjacent wireless network described above, as the adjacent projector.

Therefore, according to the network system 100, even in the case in which the PC 50 is moved from the group of wireless networks 11N through 13N each provided with the SSID of "ABC," and is connected to a different wireless network, it is possible to determine the projector adjacent to the PC 50 among the projectors 31 through 33 included in the group described above.

2. Second Embodiment

Figure 11:
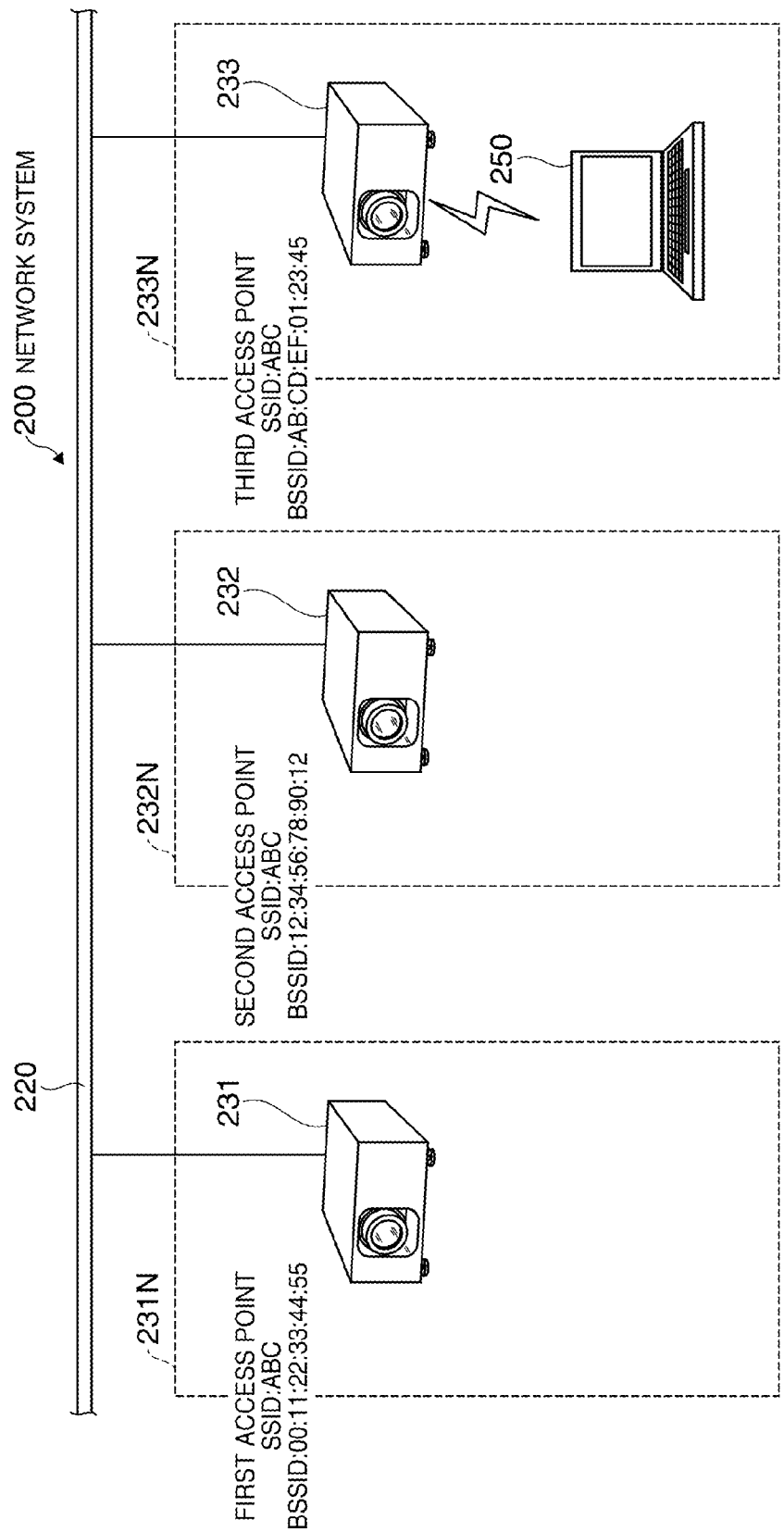
FIG. 11 is a block diagram showing a network system as a second embodiment of the invention.

FIG. 11 is a block diagram showing a network system 200 as a second embodiment of the invention. As shown in the drawing, the network system 200 is provided with first through third projectors 231, 232, 233, and the first through third projectors 231 through 233 are connected to each other via a wired network 220. Each of the projectors 231 through 233 is permanently-installed, and is not allowed to be moved. Further, each of the projectors 231 through 233 is provided with the wireless function similarly to the case of the first embodiment, and the PC 250 is wirelessly connected to the third projector 233.

Figure 12:
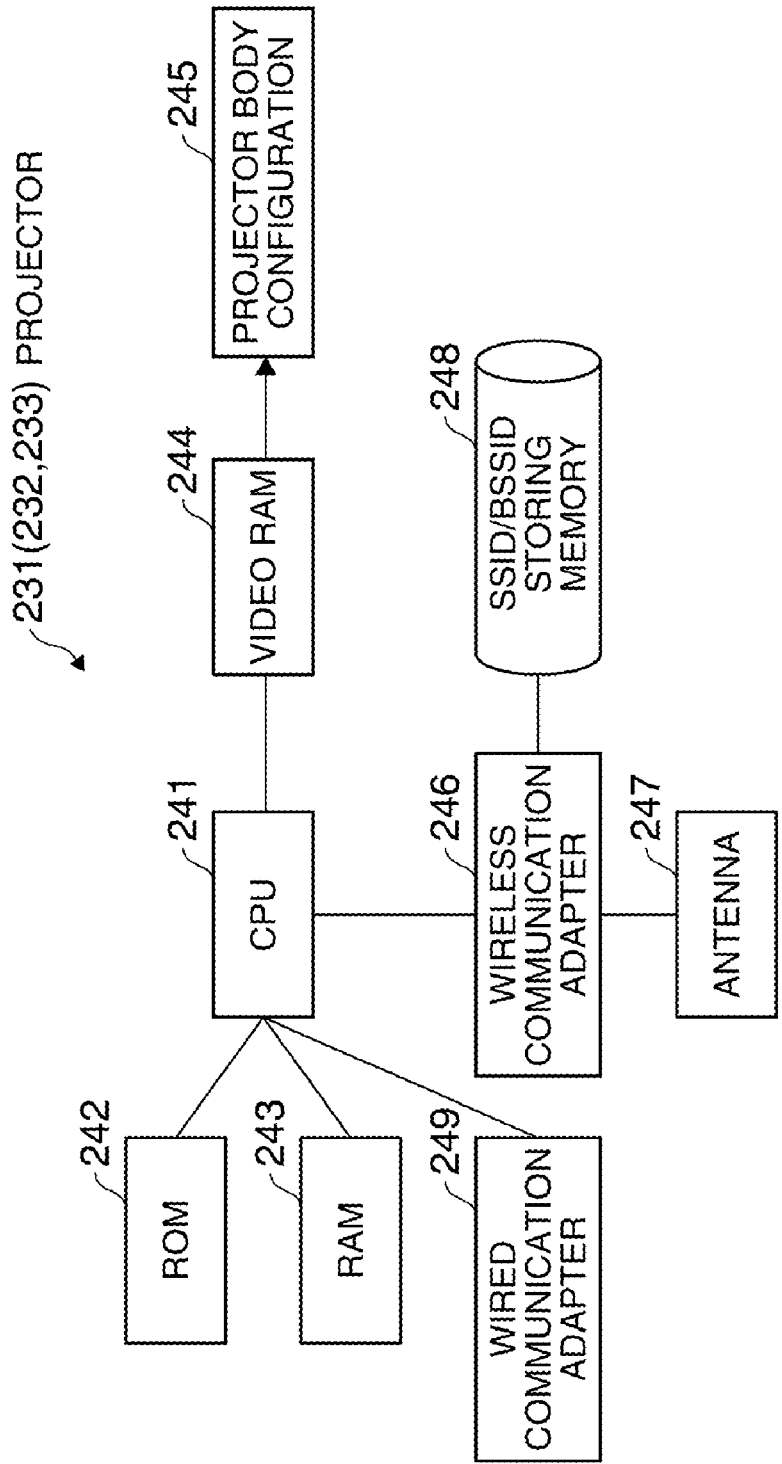
FIG. 12 is a block diagram schematically showing a configuration of each of projectors.

FIG. 12 is a block diagram schematically showing a configuration of each of the projectors 231 through 233. Similarly to the case of the first embodiment, the projectors 231 through 233 are each provided with a CPU 241, a ROM 242, a RAM. 243, a video RAM 244, a projector body configuration 245, a wireless communication adapter 246, and an antenna 247. Further, the projectors 231 through 233 are each provided with a wired communication adapter 249, and is connected to a wired network 320 via the wired communication adapter 249.

The PC 250 is the same as in the first embodiment, and belongs to the wireless network 233N provided by the wireless communication adapter 246 provided to the third projector 233. In other words, the wireless communication adapter 246 functions as an access point, and the PC 250 is wirelessly connected to the access point.

According also to the network system 200 with such a configuration, the projector adjacent to the PC 250 can be determined in a similar manner to the first embodiment. An adjacent projector detection process in the second embodiment will hereinafter be explained. It should be noted that the projectors 231 through 233 correspond to "processing devices" provided to the invention, the wireless communication adapter 246 provided to each of the projectors 231 through 233 corresponds to an "access point" provided to the invention, and the PC 250 corresponds to the "wireless communication device" provided to the invention.

Figure 13:
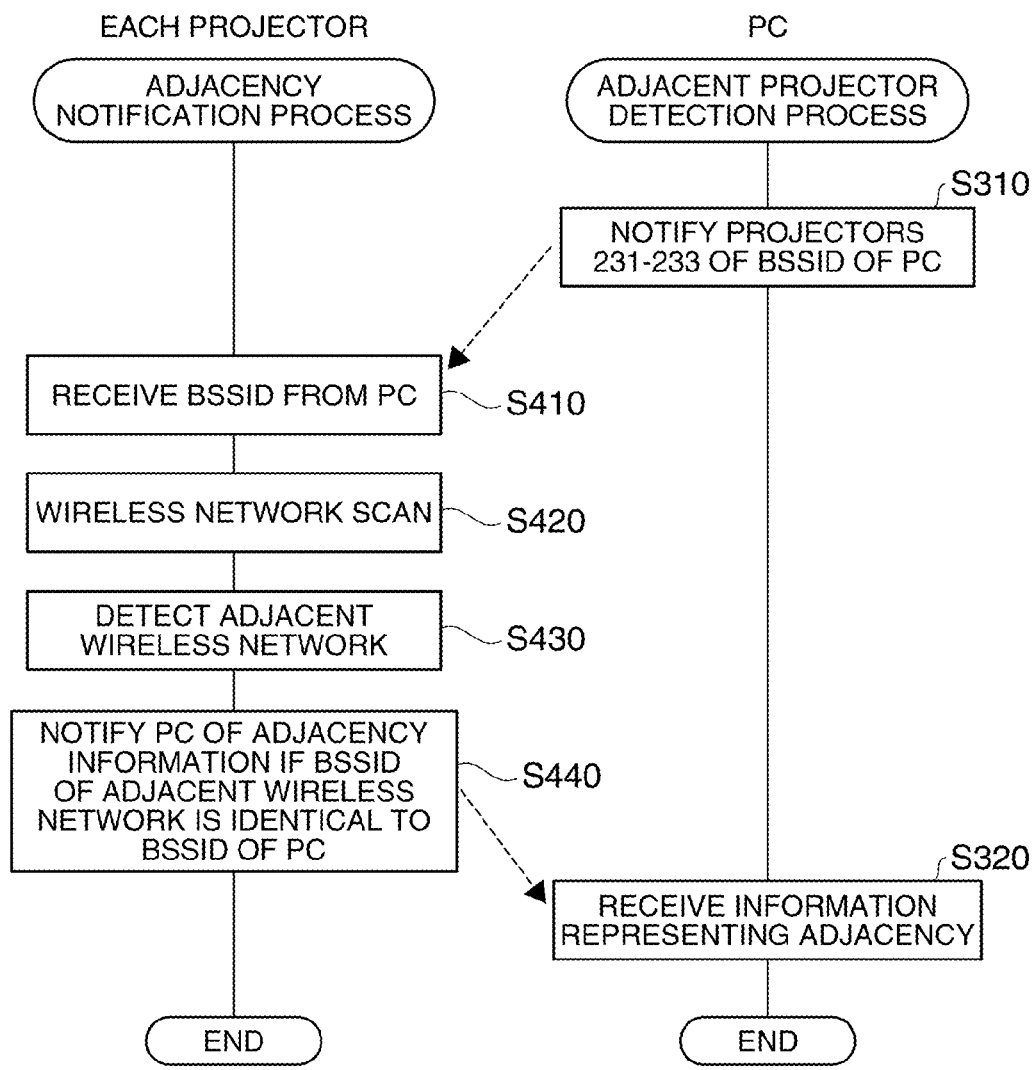
FIG. 13 is a flowchart showing an adjacent projector detection process executed in a PC and an adjacency notification process executed in each of the projectors.

FIG. 13 is a flowchart showing the adjacent projector detection process executed in a PC250 and an adjacency notification process executed in each of the projectors 231 through 233. The adjacent projector detection process executed on the PC 250 side is performed by a CPU of the PC 250 along the software (the program) installed in an HDD provided to the PC 250. The adjacency notification process executed on the projectors 231 through 233 side is performed by the CPU 241 of each of the projectors 231 through 233 along the firmware (the program) stored in the ROM 242 provided to each of the projectors 231 through 233.

When the process is started on the PC 250 side, the CPU of the PC 250 retrieves the BSSID for identifying the wireless network, to which the PC 250 belongs, from the SSID/BSSID storing memory, and then notifies the projectors 231 through 233 of the BSSID of the PC 250 (step S310).

On the projectors 231 through 233 side, the CPU 241 receives (step S410) the BSSID (hereinafter this BSSID is referred to as a "PC-belonging BSSID") transmitted from the PC 250.

Subsequently, the CPU 241 performs the wireless network scan for scanning the wireless network existing around the corresponding one of the projectors 231 through 233. The wireless network scan is one of the functions realized by the wireless communication adapter 246 provided to each of the projectors 231 through 233, and the CPU 241 makes the wireless communication adapter 246 perform the wireless network scan. The wireless network scan is the same as the wireless network scan executed on the PC 50 side in the first embodiment.

In a detailed explanation, the wireless communication adapter 246 wirelessly emits a message to the periphery, and receives the responses (the SSID and the BSSID) from the access points (the wireless communication adapters 246 of the respective projectors 231 through 233) belonging respectively to the wireless networks 231N through 233N existing around the projector itself. Thus, the wireless networks 231N through 233N existing around the projector itself are searched. Further, the wireless communication adapter 246 measures the radio field intensity of each of the signals of the responses, and then stores the SSID and the BSSID obtained from each of the responses, and the radio field intensity thus measured into the third information table TBL3 so as to form a group.

FIG. 14 is an explanatory diagram showing an example of the third information table TBL3. As shown in the drawing, the third information table TBL3 is provided with four fields FD21, FD22, FD23, and FD24 of [SSID], [RADIO FIELD INTENSITY], [BSSID], and [ADJACENCY], respectively. The third information table TBL3 is prepared in the RAM 243. In the step S420, there is executed a process of storing the SSID thus received into the [SSID] field FD21, the radio field intensity thus measured into the [RADIO FIELD INTENSITY] field FD22, and the BSSID thus received into the [BSSID] field FD23, for each of the wireless networks 231N through 233N. The [ADJACENCY] field FD24 is a field for storing a mark for determining whether or not the wireless network is adjacent to the present one of the projectors, and is set to be blank immediately after the execution of the step S420.

Subsequently, the CPU 241 sequentially determines whether or not the radio field intensity stored in the [RADIO FIELD INTENSITY] field FD22 of each record in the third information table TBL3 is equal to or higher than a predetermined value (e.g., 60%), thereby detecting the record with the higher radio field intensity out of the records in the third information table TBL3 (step S430). The record with the higher radio field intensity denotes that the wireless network is adjacent to the present one of the projectors 231 through 233. In other words, it can be said that the process of the step S430 is for detecting the wireless network adjacent to each of the projectors 231 through 233 out of the wireless networks confirmed to exist by the wireless network scan in the step S420. Further, in the step S430, with respect to the record detected to have the higher radio field intensity, the marking of "○" representing the fact that the wireless network is adjacent to the present one of the projectors 231 through 233 is stored into the [ADJACENCY] field FD24.

Subsequently, the CPU 241 retrieves the content of the [BSSID] field FD23 of the record with the [ADJACENCY] field FD24 storing the marking of "○" from the third information table TBL3, then determines whether or not the BSSID thus retrieved and the PC-belonging BSSID received in the step S410 are identical to each other, and then informs (step S440) the PC 250 of the information (hereinafter referred to as "adjacency information") representing the adjacency on the ground that the present one of the projectors 231 through 233 is adjacent to the PC 250 if it is determined that they are identical to each other.

In other words, since the record with the [ADJACENCY] field FD24 storing the marking of "○" denotes that the wireless network is adjacent to the present one of the projectors 231 through 233, and the fact that the BSSID stored in the [BSSID] field FD23 of the record and the PC-belonging BSSID are identical to each other means that the wireless network to which the PC 250 belongs is the wireless network adjacent to the present one of the projectors 231 through 233, if it is determined that they are identical to each other as described above, it can be determined that the present one of the projectors 231 through 233 is adjacent to the PC 250.

It should be noted that in the step S440, if it is not determined that they are identical to each other, the CPU 241 never informs the PC 250 of the adjacency information. After the execution of the step S440, the process escapes to "END" to terminate the adjacency notification process.

Meanwhile, in response to the adjacency information transmitted from each of the projectors, the CPU of the PC 250 receives the adjacency information (step S320). Thus, the PC 250 can determine the adjacent projector among the projectors 231 through 233 included in the network system 200 provided with the SSID of "ABC." After the execution of the step S320, the process escapes to "END" to terminate the adjacent projector detection process.

The operator is informed of the adjacent projector detected by the adjacent projector detection process described above in substantially the same manner as in the first embodiment by being displayed using the methods (a) through (c) described above.

According to the network system 200 of the second embodiment configured as described above, in the network system 200 having the configuration of providing the access points (the wireless communication adapters 246), which provide the wireless networks, to the plurality of projectors 231 through 233 connected to each other via the wired network 220, the projector adjacent to the PC 250 can be determined out of the plurality of projectors 231 through 233.

3. Other Embodiments

It should be noted that the invention is not limited to the first and second embodiments described above, and modified examples thereof, but can be put into practice in various forms within the scope or the spirit of the invention, and the following modifications, for example, are also possible.

1. Although in the first embodiment, the access points 11 through 13 are connected to each other via the wired network 20, it is also possible to adopt a configuration of connecting the access points 11 through 13 via the wireless network instead thereof. As the wireless network, those using, for example, the wireless distribution system (WDS) can be cited.

2. Although in the first embodiment described above, there is adopted the configuration in which the connection device information storing memory is formed of the RAM 43 provided with the first information table TBL1, thereby storing the information such as the BSSID in the table format, it is not necessarily required to adopt the table format, but any data format for storing the BSSID in correspondence with the response source wireless communication device can also be adopted.

3. Although in the first and second embodiments described above the BSSID is used as the identifier, the identifier is not necessarily limited to the BSSID, but can be replaced with another identifier capable of identifying a single wireless network.

4. Although in the first and second embodiments projectors are cited as the connection objects of the PC, it is also possible to adopt other wireless communication devices such as printers or multifunction printers instead thereof. What matters is that the device is provided with the wireless function, and any devices provided with the wireless function can replace the projectors. Further, the PC is not necessarily required to include the display section, but can be replaced with any device provided with the wireless function.

5. Further, in each of the embodiments described above, it is possible to replace a part of the configuration realized by hardware with software, or to replace a part of the configuration realized by software with hardware. In other words, there can also be adopted a configuration of realizing the function of each of the sections 50*a* through 50*f*, and 31*a* with hardware.

What is claimed is:

1. A network system for managing a plurality of local area wireless networks including wireless communication devices, the network system comprising:
   a plurality of wireless communication devices that includes a plurality of projectors and a predetermined wireless communication device;
   a plurality of local area wireless networks each including:
      an access point, and
      at least one wireless communication device of the plurality of wireless communication devices configured to be wirelessly connected to the access point;
   a predetermined local area network connecting the access points of the plurality of local area wireless networks to each other via a wired connection;
   at least one identifier storage section provided to each of the access points, each of the identifier storage sections configured to store an identifier identifying the local area wireless network that includes the access point to which the identifier storage section is provided;
   an inquiry request issuance section provided to the predetermined wireless communication device, the inquiry request issuance section configured to issue an inquiry request for information to the plurality of projectors, each of the plurality of projectors configured to receive the inquiry request;
   at least one inquiry response section provided to each of the plurality of projectors, each of the inquiry response sections configured to issue an inquiry response that includes transmitting the identifier of the local area wireless network that includes the projector, to which the inquiry response section is provided, to the predetermined wireless communication device;
   a reception/storage control section provided to the predetermined wireless communication device, the reception/storage control section configured to receive the identifiers transmitted from the inquiry response sections and store the identifiers in a connection device information storing memory, wherein each of the identifiers is stored in the connection device information storing memory in correspondence with the projector that transmitted the identifier; and
   a first adjacent device detection section provided to the predetermined wireless communication device, the first adjacent device detection section being configured to search, out of the identifiers stored in the connection device information storing memory, for the identifier that is identical to the identifier of the local area wireless network that includes the predetermined wireless communication device,
   wherein:
      the first adjacent device detection section is configured to determine that the projector, which transmitted the identifier that is identical to the identifier of the local area wireless network that includes the predetermined wireless communication device, is an adjacent projector that is adjacent to the predetermined wireless communication device, the predetermined wireless communication device is configured to send image data to the adjacent projector, the image data corresponding to images to be projected by the adjacent projector.

2. The network system according to claim 1, wherein the predetermined wireless communication device includes:
 a wireless network scanning section configured to scan the local area wireless networks existing around the predetermined wireless communication device in response to failure of the first adjacent device detection section in finding out the adjacent projector,
 an adjacent wireless network detection section configured to detect the local area wireless network that is adjacent to the predetermined wireless communication device out of the wireless networks confirmed to exist by the scan, and
 a second adjacent device detection section configured to search, out of the identifiers stored in the connection device information storing memory, for the identifier that is identical to the identifier of the local area wireless network detected by the adjacent wireless network detection section,
 wherein the second adjacent device detection section is configured to determine that the projector, which transmitted the identifier that is identical to the identifier of the local area wireless network detected by the adjacent wireless network detection section, is the adjacent projector.

3. The network system according to claim 1, wherein:
 the predetermined wireless communication device is an information processing device provided with a display section,
 the information processing device sends image data to the projector which the first adjacent device section determines is the projector is adjacent to the information processing device, and
 the projector projects images based on the image data.

4. The network system according to claim 1, wherein each of the identifiers is a BSSID, and
 each of the identifier storage sections is configured to store an SSID for identifying a network built up by the plurality of wireless networks together with the BSSID.

5. A predetermined wireless communication device connected to a network system that includes a plurality of local area wireless networks each having an access point, a plurality of wireless communication devices that includes the predetermined wireless communication device and a plurality of projectors, each access point configured to be wirelessly connected to at least one wireless communication device of the plurality of wireless communication devices, and a predetermined local area network configured to connect the access points of the plurality of local area wireless networks to each other via a wired connection, the predetermined wireless communication device comprising:
 an inquiry request issuance section configured to issue an inquiry request regarding identifiers for identifying each of a plurality of wireless networks, the inquiry request issued to the plurality of projectors;
 a reception/storage control section configured to store the identifiers obtained by receiving an inquiry response from each of the projectors, each of the identifiers stored in a connection device information storing memory in correspondence with the projector that transmitted the identifier; and
 a first adjacent device detection section configured to search, out of the identifiers stored in the connection device information storing memory, for the identifier that is identical to the identifier of the local area wireless network that includes the predetermined wireless communication device,
 wherein:
 the first adjacent device detection section is configured to determine that the projector which transmitted the identifier that is identical to the identifier of the local area wireless network that includes the predetermined wireless communication device, is an adjacent projector that is adjacent to the predetermined wireless communication device,
 the predetermined wireless communication device is configured to send image data to the adjacent projector, the image data corresponding to images to be projected by the adjacent projector.

6. The predetermined wireless communication device according to claim 5, further comprising:
 a wireless network scanning section configured to scan the local area wireless networks existing around the predetermined wireless communication device in response to failure of the first adjacent device detection section in finding out the adjacent projector;
 an adjacent wireless network detection section configured to detect the wireless network that is adjacent to the predetermined wireless communication device out of the wireless networks confirmed to exist by the scan; and
 a second adjacent device detection section configured to search, out of the identifiers stored in the connection device information storing memory, for the identifier that is identical to the identifier of the local area wireless network detected by the adjacent wireless network detection section,
 wherein the second adjacent device detection section is configured to determine that the projector, which transmitted the identifier that is identical to the identifier of the local area wireless network detected by the adjacent wireless network detection section, is the adjacent projector.

7. A wireless communication method of connecting a predetermined wireless communication device to a network system that includes a plurality of local area wireless networks each having an access point, a plurality of wireless communication devices that includes the predetermined wireless communication device and a plurality of projectors, each access point configured to be wirelessly connected to at least one wireless communication device of the plurality of wireless communication devices, and a predetermined local area network configured to connect the access points of the plurality of local area wireless networks to each other via a wired connection, the method comprising:
 issuing, from a predetermined wireless communication device, an inquiry request regarding identifiers for identifying each of a plurality of wireless networks to the plurality of projectors;
 storing the identifiers obtained by receiving an inquiry response from each of the projectors, each of the identifiers stored in a connection device information storing memory in correspondence with the projector that transmitted the identifier;
 searching, out of the identifiers stored in the connection device information storing memory, for the identifier that is identical to the identifier of the local area wireless network that includes the predetermined wireless communication device;

determining that the projector, which transmitted the identifier that is identical to the identifier of the local area wireless network that includes the predetermined wireless communication device, is an adjacent projector that is adjacent to the predetermined wireless communication device; and sending image data to the adjacent projector, the image data corresponding to images to be projected by the adjacent projector.

8. A computer program product embodied in at least one computer readable medium and comprising computer instructions executable by a computer to perform the method according to claim 7.

* * * * *